US012437679B2

(12) United States Patent
Cabreros et al.

(10) Patent No.: US 12,437,679 B2
(45) Date of Patent: Oct. 7, 2025

(54) FLEXIBLE OLED DISPLAY WITH RELIEFS (71) Applicant: Google LLC, Mountain View, CA (US)

(72) Inventors: Sarah S. M. Cabreros, Mountain View, CA (US); Yi Tao, San Jose, CA (US); Sangmoo Choi, Palo Alto, CA (US); Nai-Hsuan Liu, Cupertino, CA (US); William Riis Hamburgen, Palo Alto, CA (US); Ion Bita, Los Altos, CA (US); Taesung Kim, Cupertino, CA (US)

(73) Assignee: Google LLC, Mountain View, CA (US)

(*) Notice: Subject to any disclaimer, the term of this patent is extended or adjusted under 35 U.S.C. 154(b) by 579 days.

(21) Appl. No.: 17/532,304

(22) Filed: Nov. 22, 2021

(65) Prior Publication Data
US 2022/0190282 A1 Jun. 16, 2022

Related U.S. Application Data (60) Provisional application No. 63/125,692, filed on Dec. 15, 2020.

(51) Int. Cl.
G09F 9/30 (2006.01)
H10K 50/84 (2023.01)
(Continued)

(52) U.S. Cl.
CPC .............. *G09F 9/301* (2013.01); *H10K 50/84* (2023.02); *H10K 59/121* (2023.02); *H10K 71/00* (2023.02);
(Continued)

(58) Field of Classification Search
CPC . G09F 9/301; H10K 2102/311; H10K 59/121
See application file for complete search history.

(56) References Cited

U.S. PATENT DOCUMENTS 9,419,065 B2 8/2016 Degner et al.
9,515,099 B2 12/2016 Kwon et al.
(Continued)

FOREIGN PATENT DOCUMENTS

| CN | 102683384 A | 9/2012 | |
|---|---|---|---|
| CN | 109961693 A | 7/2019 | |
| CN | 111710245 A | 9/2020 | |
| CN | 112071884 A | * 12/2020 | ............. G09F 9/301 |

OTHER PUBLICATIONS

Office Action for Chinese Patent Application No. 202111515637.0 dated Oct. 24, 2023. 9 pages.
(Continued)

Primary Examiner — Lex H Malsawma
Assistant Examiner — Bruce R. Smith
(74) Attorney, Agent, or Firm — Lerner David LLP (57) ABSTRACT The present disclosure provides an electronic device utilizing a flexible display panel with multiple relief features formed in a periphery bending portion of the flexible display panel. The multiple relief features may facilitate lamination of the flexible display to a curved cover layer. The flexible display panel may have a circular shape utilized in a wearable device. An active area for displaying images may extend to the periphery bending portion of the flexible display panel, thus provided a wide viewing range for a user as well as enhancing an overall aesthetic appearance of the electronic device.

18 Claims, 11 Drawing Sheets (51) Int. Cl.
  *H10K 59/121* (2023.01)
  *H10K 59/131* (2023.01)
  *H10K 59/80* (2023.01)
  *H10K 71/00* (2023.01)
  *H10K 102/00* (2023.01)

(52) U.S. Cl.
  CPC ........... *H10K 59/131* (2023.02); *H10K 59/87* (2023.02); *H10K 2102/311* (2023.02)

(56) References Cited

U.S. PATENT DOCUMENTS

| | | | |
|---|---|---|---|
| 2013/0330495 A1* | 12/2013 | Maatta | G06F 1/1637 |
| | | | 428/137 |
| 2018/0146084 A1* | 5/2018 | Diebel | H04B 1/3888 |
| 2019/0215976 A1* | 7/2019 | Choi | H05K 5/0017 |
| 2019/0377385 A1* | 12/2019 | Bushnell | G06F 3/044 |
| 2020/0047475 A1 | 2/2020 | Gao et al. | |
| 2020/0150726 A1 | 5/2020 | Jones et al. | |
| 2020/0319678 A1 | 10/2020 | Raff et al. | |
| 2023/0111683 A1* | 4/2023 | Wang | G06F 1/1652 |
| | | | 345/55 |

OTHER PUBLICATIONS

Second Office Action for Chinese Patent Application No. 202111515637.0 dated Apr. 2, 2024. 8 pages.

\* cited by examiner

FLEXIBLE OLED DISPLAY WITH RELIEFS

CROSS-REFERENCE TO RELATED APPLICATIONS

The present application claims the benefit of the filing date of U.S. Provisional Patent Application No. 63/125,692, filed Dec. 15, 2020, the disclosure of which is hereby incorporated herein by reference.

BACKGROUND

Electronic devices often include a display assembly to display content to a user. For example, portable devices, personal digital assistants, wearable devices, such as smartwatches and smart glasses, and the like, often include the display assembly for presenting content and information to a user. The electronic device may have a cover housing, such as a housing formed from plastic or metal, that exposes an active area of the display to display the content. Some designs seek to maximize an active area of the display panel relative to the overall device footprint, such as to minimize the non-displayable area at borders or edges of the display panel, to facilitate the user viewing from different angles and with a wider range. Furthermore, reduction of the relative size of the housing at the borders of the active area of the display also enhances an overall aesthetic of the display assembly.

In order to maximize the active area of the display, a curved housing, such as a curved cover glass, is often utilized. However, during a lamination process, interfaces between the edges or borders of the curved cover glass and the bending outlying display areas often carry most of the mechanical forces or stress, thus increasing manufacturing complexity. Poor laminating often results in breakage, bubbles or wrinkling to the display assembly.

SUMMARY

The present disclosure provides an electronic device utilizing a flexible display panel with multiple relief features to facilitate lamination to a curved cover glass. In one example, a display assembly includes a flexible display panel positioned beneath the cover layer. The flexible display panel has a bending portion formed at a periphery region of the flexible display panel. A plurality of relief features is formed in the bending portion of the flexible display panel.

In some examples, the flexible display panel further comprises a planar portion formed on a center region of the flexible display panel. The planar portion has a circular shape. The planar portion has a polygon shape or irregular shape.

In some examples, the relief features are cut-out portions formed in the bending portion of the flexible display panel. The flexible display panel includes an organic light emitting diode. The flexible display panel further comprises an active area formed in the bending portion of the flexible display panel. The active area comprises arrays of pixel circuits.

In some examples, the flexible display panel further includes an inactive area in the bending portion, and a plurality of electronic components formed on the inactive area in the bending portion. A display device integrated circuit is coupled to the flexible display panel. An accessory is coupled to a housing. The flexible display panel is positioned within the housing. The display device integrated circuit is disposed in the accessory in close proximity to the housing.

In some examples, an optically clear adhesive couples the flexible display panel to a cover layer. The relief features have an arc configuration, a triangular configuration, an oval configuration, or a semi-circular configuration. The display assembly is integrated in a wearable device. The bending portion of the flexible display panel has a curvature that fits with a curved side region of a cover layer.

Another aspect of the present disclosure includes an electronic device. The electronic device includes a cover layer. A flexible display panel has a planar center region and a curved periphery region. The curved periphery region is bendable and the planar center region has a circular shape. A plurality of relief features is formed in the curved periphery region of the flexible display panel.

In some examples, the curved periphery region of the flexible display panel includes an inactive area. A plurality of electronic components is formed on the inactive area in the curved periphery region. The relief features have an arc configuration, a triangular configuration, an oval configuration, or a semi-circular configuration. Arrays of pixel circuits formed in the curved periphery region of the flexible display panel.

Yet another aspect of the present disclosure includes a method for forming a display assembly for an electronic device. The method includes laminating a flexible display panel to a curved cover layer, and positioning a plurality of relief features formed in a curved periphery region of the flexible display panel under a curved side region of the curved cover layer.

DETAILED DESCRIPTION

The present disclosure provides for an electronic device utilizing a flexible display panel to present or display information, content, or images to a user. The electronic device may be a portable device, a wearable device or other suitable electronic devices. In one example, the electronic device utilized herein is a smartwatch. The electronic device includes a flexible display panel embedded therein having multiple bending portions. The bending portion may have a curvature that fits with a curved side portion of a curved cover layer where the flexible display panel is attached to.

In one example, multiple relief features are formed at the bending portions of the flexible display panel. The relief features formed at the bending portions may assist releasing local bending stress or bending strain generated at the interface when laminating the flexible display panel to the curved cover layer. An active area, such as an active content displaying region, may also be formed in the bending portions to provide a continuous display that enables the user to view a border region of the electronic device.

Figure 1A:
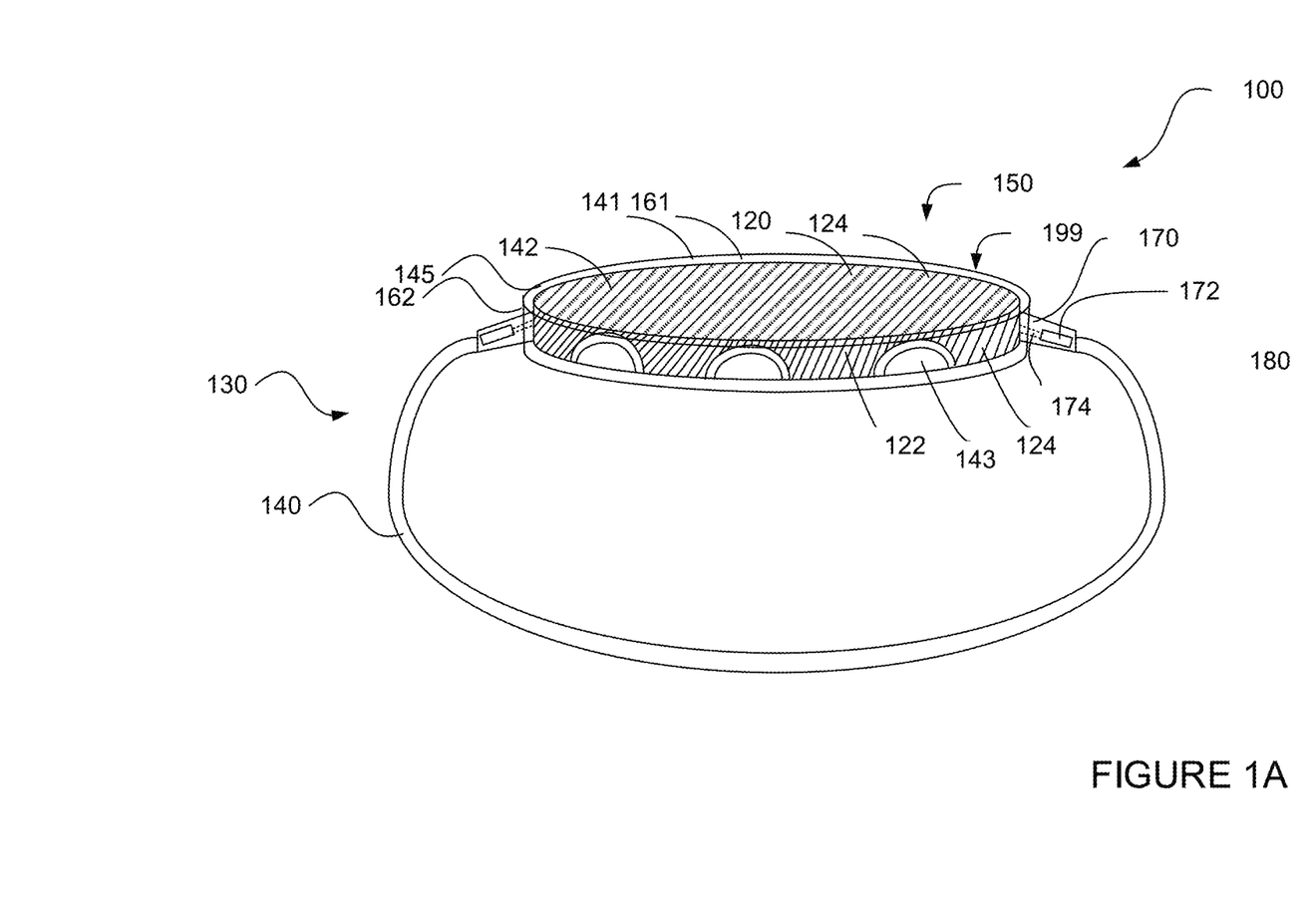
FIG. 1A-1B depict example smartwatches with a flexible display panel in accordance with aspects of the disclosure.

FIG. 1A illustrates an example electronic device. In this example, the electronic device is a wearable device, such as a smartwatch 100. However, it should be understood that the wearable device may be any of a variety of wearable devices, such as pendants, head-mounted displays, such as smart glasses, smart helmets, earbuds, or any of a variety of other devices.

The smartwatch 100 includes a watch body 145. A housing 199 is utilized to enclose the watch body 145. While in the example shown the watch body 145 is round or circular in shape, the watch body 145 may be any shape, such as rectangular, square, irregular, oval, polygon, arbitrary shape, etc. The watch body 145 may include a display assembly 150. The display assembly 150 includes a cover layer 141 and a display panel 142 disposed under the cover layer 141. In one example, the cover layer 141 may be made from a variety of materials, such as metal, plastic, glass, ceramics, or any combination of these or other material. In the example depicted herein, the cover layer 141 is made by a transparent material, such as glass.

The display panel 142 may be an organic light-emitting diode (OLED) display or other suitable displays. The display panel 142 may include a planar portion 120 and a bending portion 122. The bending portion 122 is formed at a bezel region, periphery region, border region or edge region of the display panel 142 in connection with the planar portion 120. The bending portion 122 allows extension of an active area 124 (shown as hatch patterns in FIG. 1A) from the planar portion 120 to the border/corner region of the watch body 145 for continuously displaying content, information, or images in the display panel 142. Thus, a continuous display from the planar portion 120 to the bending portion 122 of the display panel 142 may be provided for a wide viewing range and angle to the user, such as high screen-body ratio for "all-screen" design, as well as enhancing an overall aesthetic appearance of the watch body 145. The active area 124 includes arrays of display pixels that are associated with a pixel circuit, which includes at least one switching thin-film transistor (TFT) and at least one driving TFT. Each pixel circuit may be electrically connected to a gate line and a data line, and communicates with the driving circuits, such as a gate driver and a data driver, positioned in the inactive area of the display panel 142 to operate the associated pixel. It is noted that various additional components, such as inverter circuit, a multiplexer, an electrostatic discharge (ESD) circuit and the like, may be positioned in an inactive area of the display panel 142 generating a variety of signals for operating the pixels in the active area 124. Furthermore, the display panel 142 may also include components with different functions other than for operating the pixels located in the active area 124. For example, the display panel 142 may include components for providing a touch sensing operation, a user authentication process, e.g., finger print scan, a multi-level pressure sensing process, a tactile feedback process and/or various other process or operations for the electronic device utilized in the display panel 142.

The bending portion 122 of the display panel 142 may eliminate, reduce or minimize an inactive area seen from the front side of the display assembly 150. By utilizing the bending portion 122 at an edge, bezel, border, or periphery region of the display panel 142, the inactive area of the display panel 142 may then be confined in the bending portion 122 to be folded to a vertical side or bottom side of the display panel 142, such as non-viewable by a user from the front side, so the active area of display in the display panel 142 be maximized and the overall device aesthetics may be enhanced.

In one example, the display assembly 150 may include capacitive touch sensor electrodes for a capacitive touch sensor array or other touch sensor structures. Touch sensor electrodes may be provided on a touch layer that is interposed between the display panel 142 and the cover layer 141 or may be formed on an underside of the cover layer 141 or may be incorporated on the planar portion 120 and part of the bending portion 122 of the display panel 142.

In one example, the planar portion 120 may have a round or circular shape. The planar portion 120 may also have irregular, polygon or other suitable shapes.

A plurality of the relief features 143 are formed in the bending portion 122 of the display panel 142. The relief features 143 may relieve mechanical or bending stresses associated with bending at the bending portion 122. The relief features 143 may be cut-out portions or cut-out structures that remove some of the materials from the periphery region of the display panel 142. The relief features 143 may be in any configurations, patterns or dimensions. In one example, the relief features 143 may be shaped in an arc configuration, triangular configuration, oval configuration, semi-circular configuration or other suitable configurations. In the example depicted herein, some of the relief features 143 may be omitted in their entireties or may be altered from the forms shown, for example, through formation of more or less relief features 143, the relief features 143 of differing cross-sections, numbers or shapes than those shown, or through other structures of relieving mechanical stresses associated with bending at the bending portion 122.

Figures 3A, 3B:
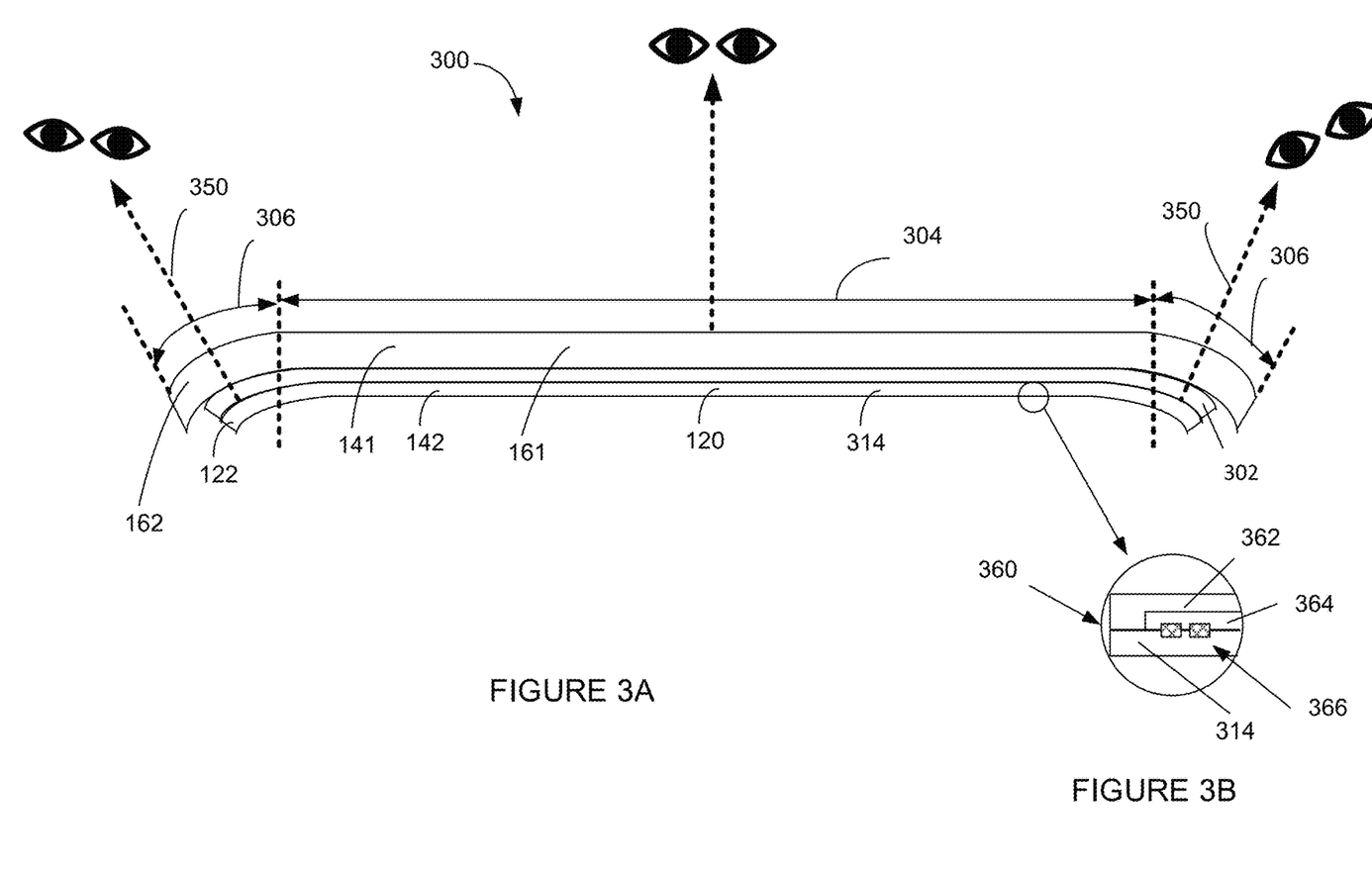
FIGS. 3A-3B depict a cross sectional view of a display assembly in accordance with aspects of the disclosure.

The cover layer 141 may be attached or bonded to the display panel 142 by a lamination process. In one example, the cover layer 141 includes a planar region 161 and a curved side region 162. The planner region 161 is bonded to the planar portion 120 of the display panel 142 while the curved side region 162 is bonded to the bending portion 122 of the display panel 142. An adhesive material 302, as shown in FIG. 3, may be utilized for bonding the cover layer 141 to the display panel 142 within minimum interface defects, such as bubbles or interstitial gaps. The relief features 143 formed in the bending portion 122 of the display panel 142 also assists minimizing interstitial gaps or discharging air during the lamination process so as to prevent wrinkle or cracks and provide a good fitting interface.

The wearable device 100 may include one or more accessories, such as a watch band 130. In other examples where the wearable device 100 is a different device, the body of the device may have a different type of accessory. For example, a pendant may include an accessory such as a necklace. The watch band 130 may be made from a variety of materials, such as metal, rubber, nylon, cotton, plastic, glass, ceramics, or any combination of these or other material. The watch band 130 may be adapted to be worn around a person's wrist. For example, the watch band 130 includes a strap 140. The strap 140 may be adjusted to provide a secure and comfortable fit around the wrist of the wearer. In other examples, the watch band may be a bracelet, such as for a looser fit, or another type of attachment mechanism.

The watch band 130 may further include a receptacle 170 adapted to secure the watch body 145 of the smartwatch 100 to the watch band 130. For example, to accommodate the watch body 145, the receptacle 170 may have a similar shape as the watch body 145. Further, the receptacle 170 may include features such as grooves, hooks, locks, screws, pins, magnets, etc., which may interlock with features of the watch body 145 to ensure secure attachment. Although the receptacle 170 is shown in this example, in other examples, the watch band 130 may include other mechanical features such as pins, screws, hooks, locks, etc. that secure the watch band 130 directly to the watch body 145.

In some examples, the watch band 130 may be configured to contain electronic and/or mechanical components. For example, electronic components 172 are shown positioned inside the receptacle 170. It is noted that the electronic components 172 may be positioned in any suitable locations of the smartwatch 100, such as in the strap 140. The electronic components 172 may include driving circuits, such as gate drivers, display device integrated circuit, emission (source) drivers, power (VDD) routing, electrostatic discharge (ESD) circuits, multiplex (mux) circuits, data signal lines and the like for transferring and/or receiving data from components in the watch body 145, and from/to other devices or circuits. The electronic components may further include identification and/or authentication devices, such as Radio Frequency Identification (RFID) devices, which may be linked to a user profile or account. Conductive traces 174 may be utilized to maintain electrical communications between the electronic components 172 and the electronic components in the watch body 145 including the display panel 142.

Figure 1B:
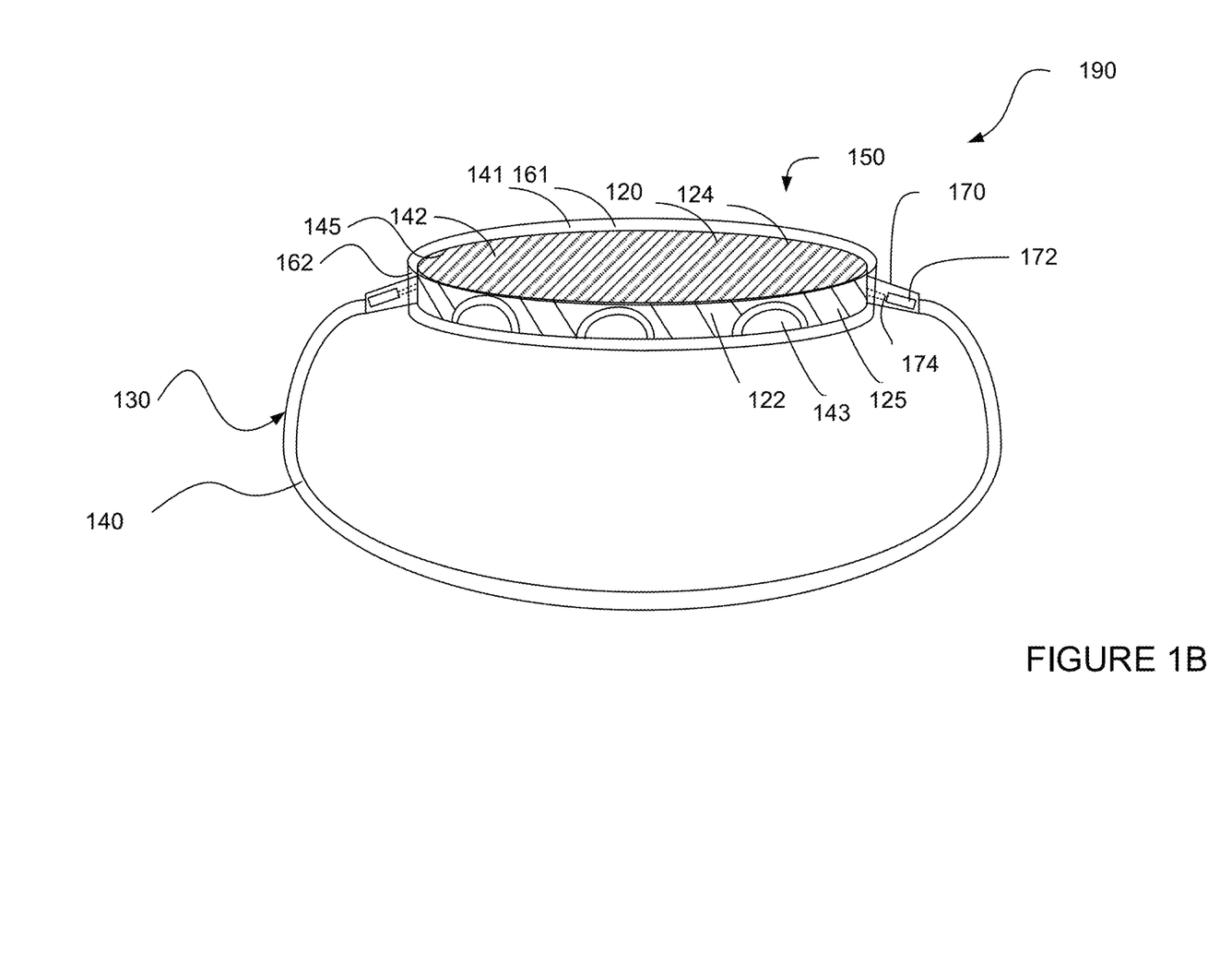

FIG. 1B depicts another example of a smartwatch 190 that is substantially similar to the smartwatch 100 depicted in FIG. 1B, except that an active area 124 of display does not extend to the bending portion 122 of the display panel 142. For example, the active area 124 of display is configured to be in the planar portion 120 without extending to the bending portion 122, maintaining the active area 124 in the planar portion 120 while forming an inactive area 125 in the bending portion 122. The plurality of relief features 143 is formed in the bending portion 122 to facilitate lamination of the display panel 142 and the curved side region 162 of the cover layer 140.

It is noted that the area, sizes, dimensions of the active area formed in the display panel may be varied based on different design, manufacturing, and cost considerations.

Figure 2:
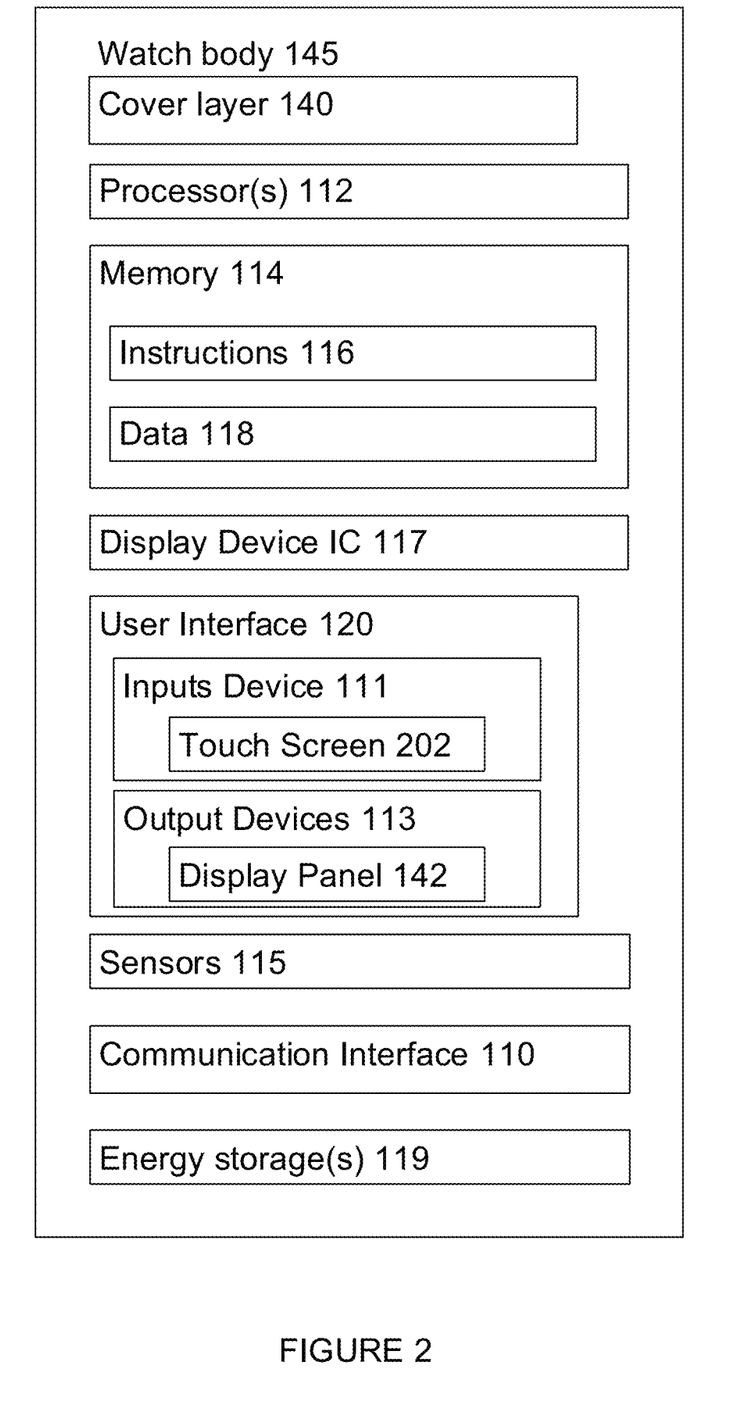
FIG. 2 is an example functional block diagram of an example electronic device in accordance with aspects of the disclosure.

FIG. 2 is a block diagram of an example of the watch body 145 in the smartwatch 100, 190 that includes multiple electronic components, including the display panel 142 laminated with the cover layer 140 in accordance with aspects of the disclosure. The example block diagram depicted herein should not be considered as limiting the scope of the disclosure or usefulness of the features described herein. In the example as shown, the watch body 145 may contain one or more processors 112, memory 114 and other components typically present in general purpose computing devices.

Memories 114 may store information accessible by the one or more processors 112, including instructions 116, that can be executed by the one or more processors 112. Memories 114 can also include data 118 that can be retrieved, manipulated or stored by the processors 112.

Further as shown in FIG. 2, the watch body 145 may include a user interface 120 that includes one or more input devices 111 and one or more output devices 113. For example, the input device 111 may include a touch screen 202 and output device 113 may include the display panel 142. Other components, such as mechanical actuators, soft actuators, periphery devices, sensors, and/or other suitable features may also be included in the user interface 120. It is noted that the touch screen 202 and the display panel 142 as described herein may refer to the same object to provide multiple functionalities. For example, the display panel 142 may not only display content but also provides a touch-activated interface, referred to as the touch screen 202, that allows the user to input commands and to actively interact therewith. In some examples, the touch screen 202 may be incorporated as a touch layer formed on the display panel 142, or an underside layer formed on an undersurface of the cover layer 140.

Users may be able to interact with the smartwatch 100, 190 using the input device 111, such as opening a webpage or an email, writing a message, controlling display or audio functionalities, controlling sensors to monitor heart rate or body temperature, locating by GPS, etc. The watch body 145 may include the one or more output devices, such as output devices 113. For example, the output devices 113 may include one or more speakers, transducers or other audio outputs, the display panel 142, a haptic interface or other tactile feedback that provides non-visual and non-audible information to the user. For example, the display panel 142 in the output devices 113 may display visual information, content or image to the user, such as texts, graphics, videos, etc. As another example, speakers in output devices 113 may be used to play music, emit audio for navigational or other guidance, for multimedia files, for voice calls, for translated speech, etc. Further, haptic or tactile feedback in the output devices 113 may be used to generate non-visual and non-audible alerts, such as by vibration.

The watch body 145 may include one or more sensors, such as sensors 115. For example, sensors may include a visual sensor, an audio sensor, a touch sensor, etc. Sensors may also include motion sensors, such as an Inertial Measurement unit ("IMU"). According to some examples, the IMU may include an accelerometer, such as a 3-axis accelerometer, and a gyroscope, such as a 3-axis gyroscope. The sensors may further include a barometer, a vibration sensor, a heat sensor, a radio frequency (RF) sensor, a magnetometer, a barometric pressure sensor, a heart rate sensor, a body temperature sensor. Additional or different sensors may also be employed. In some examples, sensors 115 may include sensors for detecting a battery state, a presence of a wireless charging device, or any of a variety of other conditions.

Watch body 145 may include a communication interface 110. The communication interface 110 may enable exchange of information with other devices. The communication interface 110 may include a communication receiver and transmitter system to modulate and transmit signals for data or signal transmission. The communication interface 110 may be controlled by the processors 112. In other examples, the communication interface 110 may alternatively be configured to transmit and/or receive data according to wireless signal transmission standard, Bluetooth standard or other suitable standard, etc.

The communication interface 110 may enable wireless network connections, wireless ad hoc connections, and/or wired connections. The communication systems may be configured to support communication via cellular, LTE, 4G, 5G, WiFi, GPS, and other networked architectures. The communication interface 110 may be configured to support Bluetooth®, Bluetooth LE, near field communication (NFC) standards, Qi standards, and non-networked wireless arrangements. The communication interface 110 may support wired connections such as a USB, micro USB, USB type C or other connector, for example to receive data and/or power from a laptop, tablet, smartphone or other device.

The watch body 145 may include one or more energy storages, such as energy storages 119 configured to receive and store power generated. In one example, the energy storage 119 may be a battery.

The watch body 145 also includes a display device integrated circuit (DDIC) 117 that may be in electrical communication to the touch screen 202 and the display panel 142 in the user interface 120. The display device integrated circuit (DDIC) 117 may control and provide a desired level of display resolution for the display panel 142. The display device integrated circuit (DDIC) 117 provides an interface between processor(s) 112 and the display panel 142. The display device integrated circuit (DDIC) 117 transmits electric signals to activate the arrays of pixels in the display panel 142 to ultimately produce an image on the display panel 142.

Although not shown, the watch body 145 may also include other additional components. For example, the watch body 145 may include a position determination module, which may include a GPS chipset or other positioning system components. Information from the sensors and/or from data received or determined from remote devices, such as wireless base stations or wireless access points, can be employed by the position determination module to calculate or otherwise estimate the physical location of the watch body 145 and/or watch band 130. As another example, the watch body 145 may include one or more internal clocks. The internal clocks may provide timing information, which can be used for time measurement for apps and other programs run by the computing devices, and basic operations by the computing devices, sensors, inputs/outputs, GPS, communication system, etc.

Although the components shown in FIG. 2 is included in the watch body 145, it is noted that the one or more components of FIG. 2 may also be implemented or configured in other places of the smartwatch 100, such as the watch band 130.

FIG. 3A depicts a cross sectional view of a display assembly 300 including the cover layer 141 and the display panel 142 bonded through adhesive material 302. In one example, the adhesive material 302 may be an optically clear adhesive (OCA). It is noted that the example depicted in FIG. 3 is just for illustration purpose. Some components, such as devices, transistors, signal lines, or other details or components are not shown in FIG. 3A for ease of description.

The display assembly 300 generally includes a planar zone 304, such as a center zone, and a curved zone 306, such as a periphery zone, formed on an edge, bezel, border, or periphery region of the display assembly 300. The planar zone 304 includes the planar region 161 in the cover layer 141 bonded to the planar portion 120 from the display panel 142 while the curved zone 306 includes the curved side region 162 from the cover layer 162 bonded to the bending portion 122 from the display panel 142. The planar zone 304 has substantially a round or circular shape. It is noted that the planar zone 304 may also be irregular, polygonal or other suitable shapes. The cover layer 141 may be a transparent material utilized to protect the display panel 142. The cover layer 141 may be formed from plastic or glass and may be flexible or rigid. The curved side region 162 of the cover layer 162 may provide a curved surface with a desired curvature to be fit to bending portion 122 from the display panel 142.

The curved zone 306 of the display assembly 300 provides bezel-minimizing effect on the edges of the display assembly 300, thus providing an immersive visual experience 350 and aesthetic to users as well as improving utilized active area of the display panel 142.

In one example, the display panel 142 may be a flexible display including multiple structures formed on a substrate 314. FIG. 3B depicts a magnified view of a portion of the display panel 142 having structures 360 formed in the display panel 142. Structures 360 formed in the display panel 142 include arrays of pixels including organic light-emitting diode structures. For example, a plurality of layers may be formed on the substrate 314 including OLED structures for emitting light for displaying images. An encapsulating layer 362 is formed on an organic light emitting material layer 364 having a plurality of thin film transistor devices 366 formed thereon. Each pixel may be associated with a pixel circuit, which includes at least one switching thin-film transistor (TFT) device and at least one driving TFT device. Each pixel circuit may be electrically connected to a gate line and a data line and communicates with the driving circuits, such as a gate driver and a data driver to operate the associated pixel. A base layer, such as the substrate 314, is then formed in contact with the organic light emitting material layer 364. The substrate 314 may include a thin flexible plastic film formed from polyimide, polyethylene naphthalate (PEN), polyethylene terephthalate (PET), other suitable polymers, a combination of these polymers, etc. Other suitable substrates that may be used to form the substrate 314 include glass, metal foil covered with a dielectric, a multi-layer polymer stack, a thin glass film bonded to a thin polymer, a polymer composite film comprising a polymer material combined with nanoparticles or microparticles dispersed therein, etc.

Figure 4A:
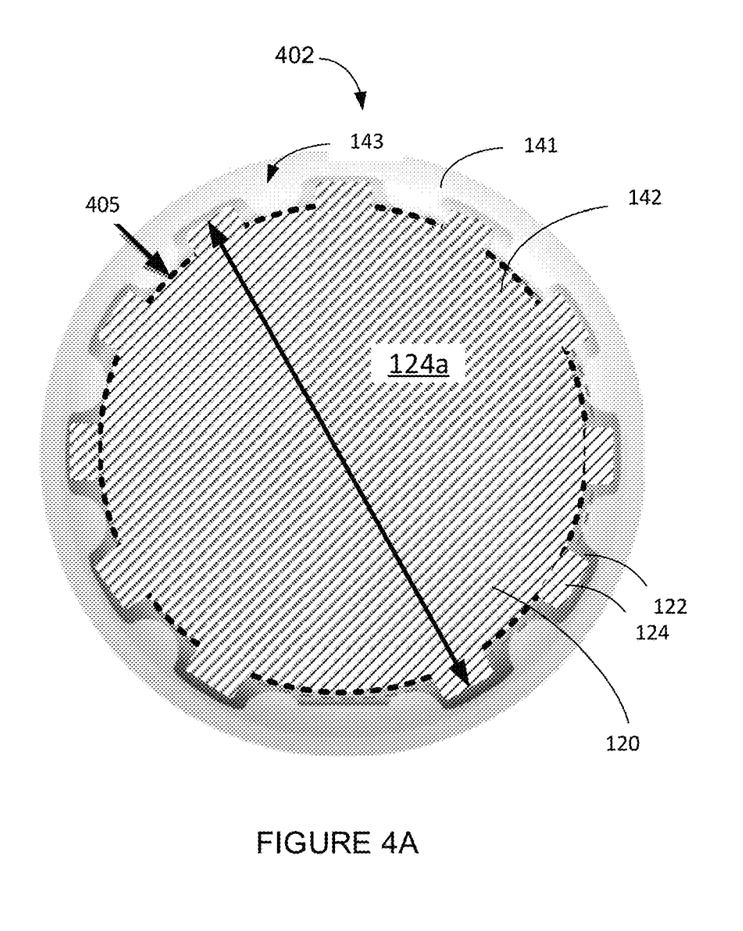
FIGS. 4A-4B depict top views of active areas in the display assembly in accordance with aspects of the disclosure.
Figure 4B:
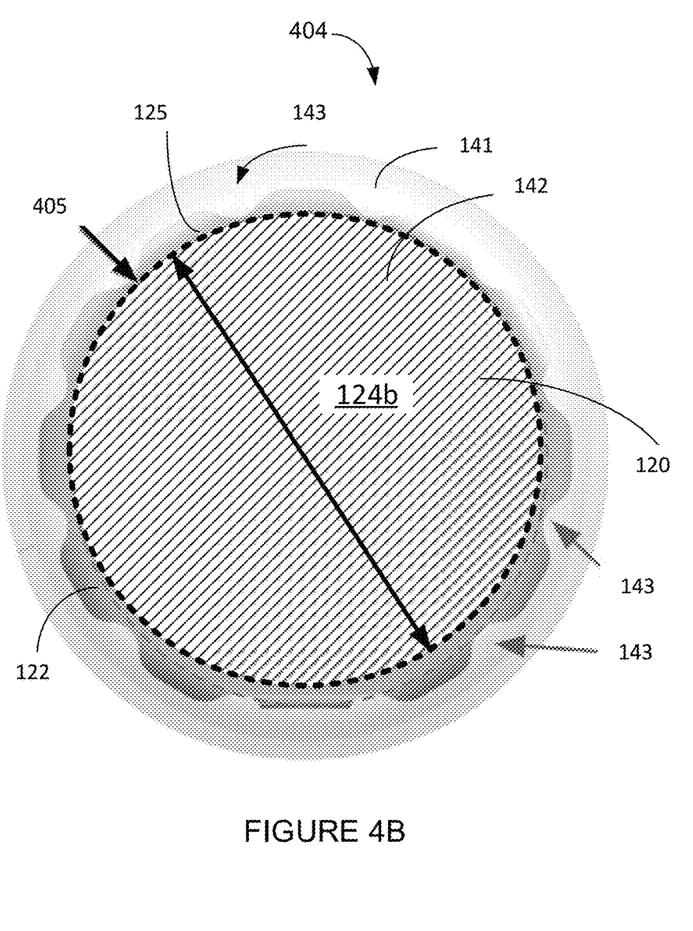

FIGS. 4A-4B depict top views of display assemblies 402, 404 with different dimensions of active areas 124a, 124b formed in the display panels 142. The display assembly 402 depicted in FIG. 4A may be a top view of the smartwatch 100 depicted in FIG. 1A while the display assembly 404 depicted in FIG. 4B may be a top view of the smartwatch 190 depicted in FIG. 1B. A plurality of relief features 143, such as cut-out portions, may be formed in the bending portions 122 to assist releasing local bending stress. In the example depicted in FIG. 4A, the active area 124a is formed in the planar portion 120 as well as extending to the bending portion 122 of the display panel 142. Thus, an inactive area formed in the bending portion 122 is relatively minimal. The relief features 143 formed in the bending portions 122 remove a portion of the active area from the display panel 142.

In contrast, in the example depicted in FIG. 4B, the active area 124b is formed in the planar portion 120 without extending to the bending portion 122. Thus, the bending portion 122 in the example depicted in FIG. 4B includes a relatively larger inactive area 125, such as without arrays of pixels formed thereon. The relatively larger dimension of the inactive area 125 may allow various periphery circuits or components formed therein to facilitate electrical communications between the display panel 142 and other components, such as processors or DDIC, disposed in the watch body 145. Thus, by different design requirements, different dimensions of the inactive areas formed in the bending portion 122 may be selected to facilitate positioning of various periphery drivers, circuitries or components.

In one example, the bending portions 122 are bendable, such as bendable flaps, that may create curved surfaces that fit with the curvature defined by the curved side region 162 of the cover layer 141. Thus, a good fitting interface may be obtained by the matching curvature therebetween, thus eliminating interface defects, cracks, or wrinkle during the lamination process. As the bending portions 122 are in connection with the planar portion 120, the bending portions 122 defined between the relief features 143 may be flared out from a circular edge 405, or called a perimeter or circular end, of the planar portion 120.

In some examples, ink or other material may be applied to the cover layer 141 to cover or disguise the relief features 143 for overall aesthetic appearance of the display assemblies 402, 404. For example, the ink or other material may be applied in a pattern or mask that corresponds to the relief features 143. Further, the ink may be colored to match a color of the active area of the display assembly. As such, the relief features 143 may be hidden or disguised.

Figure 5A:
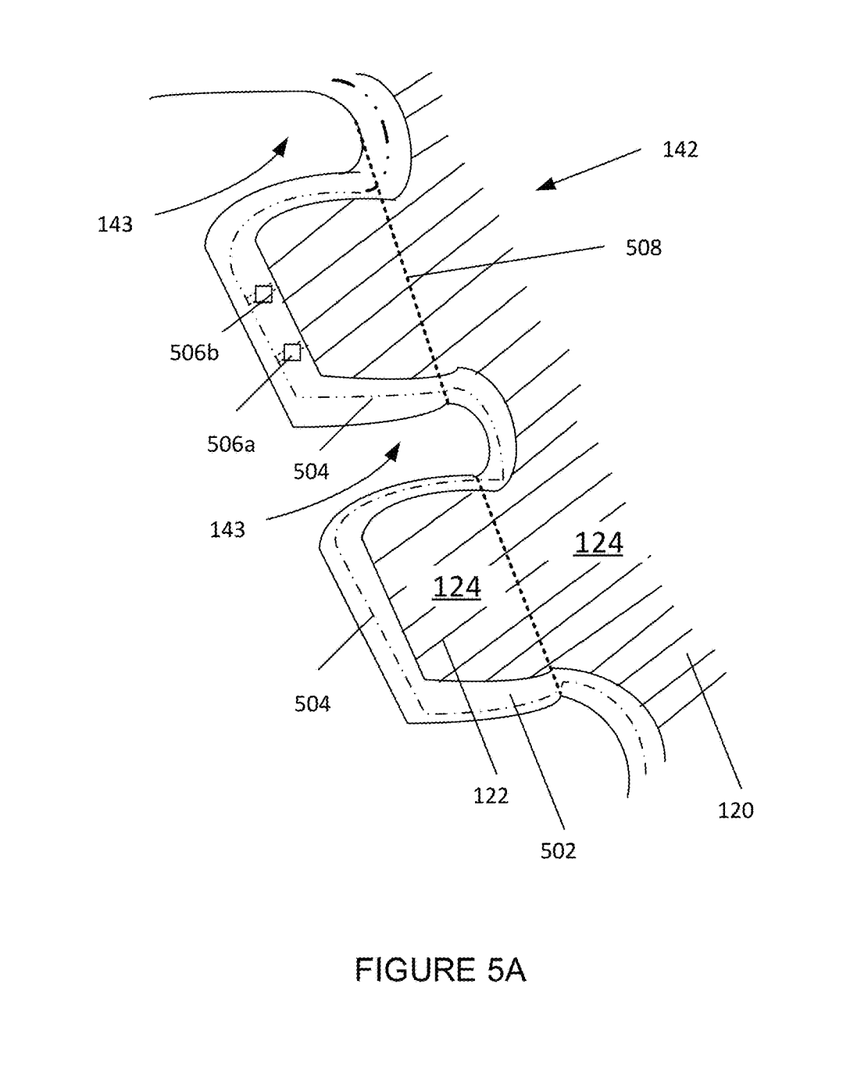
FIGS. 5A-5B depict perspective views of examples of a peripheral portion of a flexible display panel with multiple bending portions prior to and after bending in accordance with aspects of the disclosure.
Figure 5B:
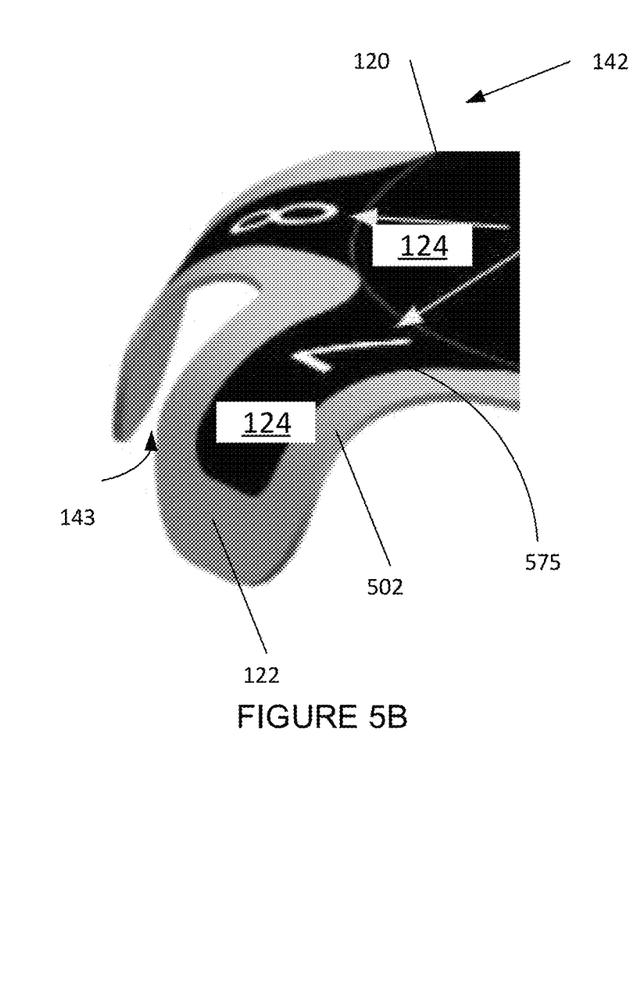

FIGS. 5A-5B depict a magnified view of a portion of the bending portion 122, such as bendable flaps, of the display panel 142 with the active area 124 extending to the bending portion 122 prior to and after the bending portion 122 along a bending line. A plurality of bending lines 508 may be formed in the display panel 142 so that the bending portion 122 may be bendable and/or foldable along the bending line 508. FIG. 5A depicts an example of the bending portion 122 of the display panel 142 prior to bending while FIG. 5B depicts an example of the bending portion 122 of the display panel 142 after bending along the bending line 508. The plurality of relief features 143 is formed at the bending portion 122 of the display panel 142. In one example, the bending portion 122 may be bended along the bending line 508 having a radius less than 3 mm, such as less than 2 mm. As the active area 214 is extended into the bending portion 122, the functional devices, such as OLED stacks, formed in the active area 214 may be manufactured in a manner that provides flexibility so that the functional devices may be folded without deteriorating the device structures.

As the active area 124 is extended into the bending portion 122 of the display panel 142, content, information or image may be shown in the bending portion 122. For example, features 575, such as alphabet numbers, roman numbers, word numbers, dots, bars, or other suitable features utilized to depict time and/or information, may be displayed in the bending portion 122. Furthermore, the active area 124 in the bending portion may also be utilized to show symbols, text messages, or other information that does not require large dimension for displaying, such as battery level, telecommunication signal strength level, biometric information, e.g., heart beats, or other information set by the user. A plurality of electronic components, such as drivers 506 a or circuits 506 b may be formed on the inactive area 502 in the bending portion 122. The inactive area 502 in the bending portion 122 may provide space to facilitate positioning various periphery drivers, circuitries or components, such as the drivers 506 a or circuits 506 b, thereon. Multiple signal lines 504 may be utilized to provide electrical connections among the periphery drivers, circuitries or components to the processors or display panel 142 located at other locations of the smartwatch 100, 190. Thus, the periphery drivers, circuitries or components may be folded to the side or even to a bottom side of the display panel 142 to maximize the displayable active areas formed on the front side of the smartwatch 100.

Figure 6A:
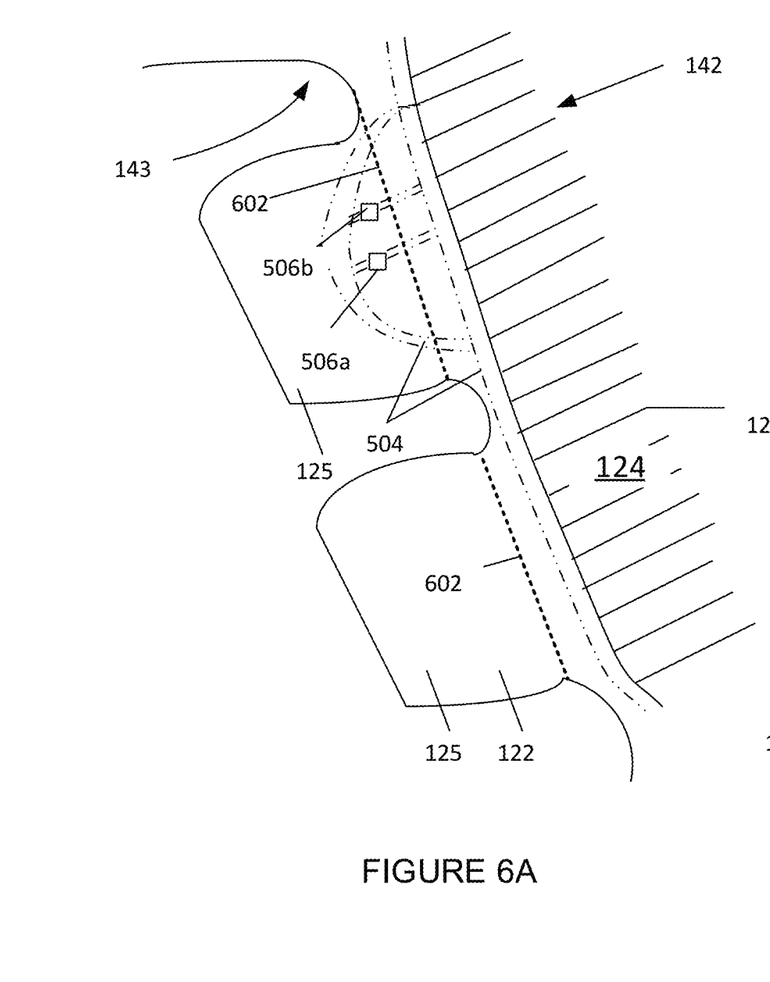
FIGS. 6A-6B depict perspective views of another example of a peripheral portion of a flexible display panel with multiple bending portions prior to and after bending in accordance with aspects of the disclosure.
Figure 6B:
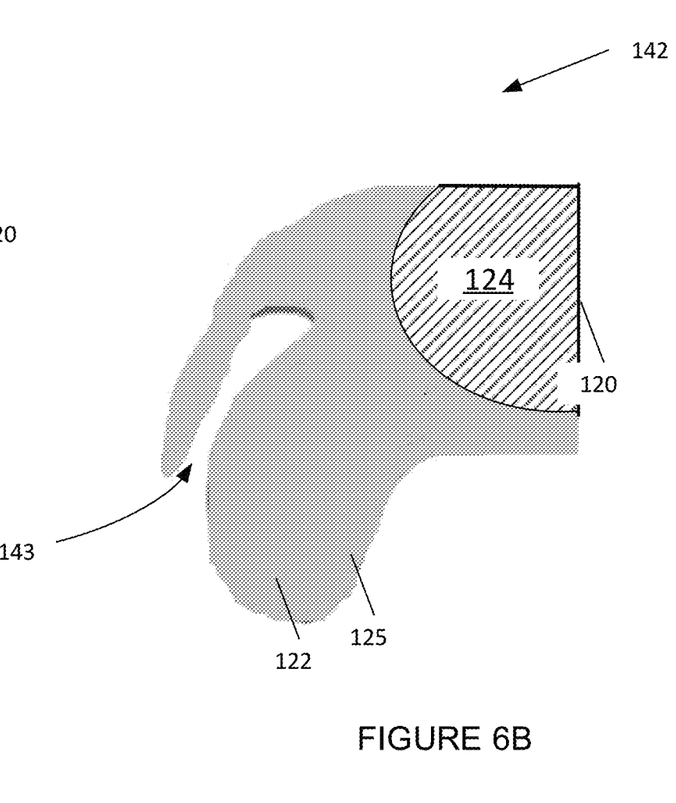

FIGS. 6A-6B depict a magnified view of a portion of the bending portion 122 of the display panel 142 with the active area 124 confined in the planar portion 120 without extending to the bending portion 122, prior to and after the bending portion 122 bending along a bending line 602. The plurality of bending lines 602 may be formed in the display panel 142 so that the bending portion 122 may be bendable and/or foldable along the bending line 602. FIG. 6A depicts an example of the bending portion 122 of the display panel 142 prior to bending while FIG. 6B depicts an example of the bending portion 122 of the display panel 142 after bending along the bending line 602. The plurality of relief features 143 is formed at the bending portion 122 of the display panel 142. A plurality of electronic components, such as drivers 506a or circuits 506b may be formed on the inactive area 125 in the bending portion 122. As the active area 124 does not extend into the bending portion 122, the relatively larger dimension of the inactive area 125 in the bending portion 122 may provide more available space to facilitate positioning various periphery drivers, circuitries or components, such as the drivers 506a or circuits 506b, thereon. Multiple signal lines 504 may be utilized to provide electrical connections among the periphery drivers, circuitries or components to the processors or display panel 142 located at other locations of the smartwatch 100, 190. Thus, the periphery drivers, circuitries or components may be folded to the side or even to a bottom side of the display panel 142 to maximize the active areas formed on the front side of the smartwatch 100.

Figure 7A:
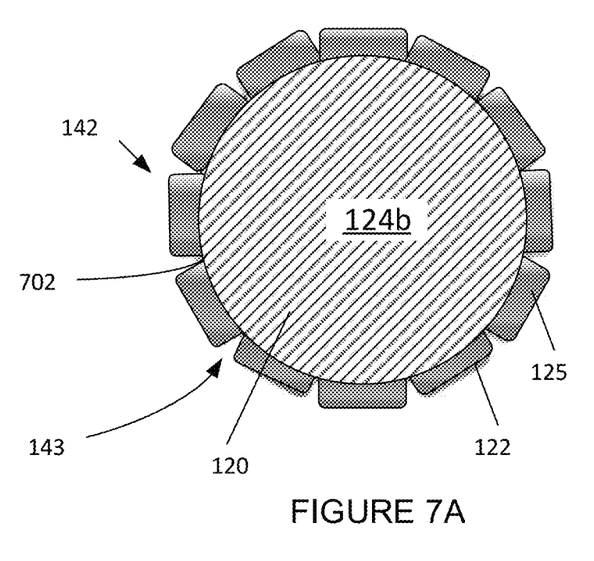
FIGS. 7A-7B depict top views of a flexible bending display with multiple bending portions defined by multiple relief features with different dimensions of active areas in accordance with aspects of the disclosure.
Figure 7B:
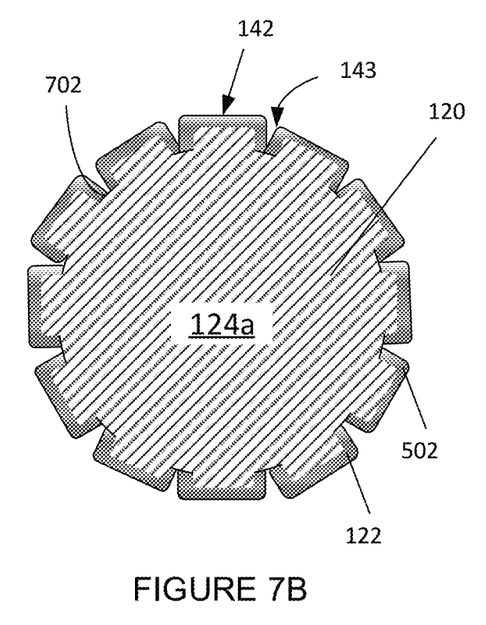

FIGS. 7A-7B depict top views of display panel 124 with different dimensions of active areas 124a, 124b formed in the display panels 142 prior to bonding to the cover layer 141. The plurality of relief features 143, such as cut-out portions, may be formed in the bending portions 122 to assist releasing local bending stress. In the example depicted in FIG. 7A, the active area 124b is formed in the planar portion 120 without extending to the bending portion 122 of the display panel 142. Thus, the bending portion 122 in the example depicted in FIG. 7A includes a relatively larger inactive area 125, such as without arrays of pixels formed thereon. In the example depicted in FIG. 7B, the active area 124a is formed in the planar portion 120 and further extends to the bending portion 122. Thus, the inactive area 502 formed in the bending portion 122 is relatively minimal. In the example depicted in FIGS. 7A-7B, in total twelves relief features 143 are formed in the display panel 142, thus defining in total twelves bending portions 122 in the periphery regions, such as ends or perimeter, of the display panel. It is noted that the relief features 143 may be formed in any numbers, such as four, twelves, twenty or any suitable numbers. In one example, the planar portion 120 may have a circular configuration, oval configurations or other substantially round configurations. It is noted that the bending portion 122 may or may not be continuously formed around the perimeter of the display panel 142. For example, some of the bending portions 122 may be skipped to allow additional features, such as buttons or watch crown, to be formed in the display panel 124. Furthermore, some of the bending portions 122 may have different dimensions to accommodate different design requirements.

The center region, such as the planar portion 120, may have a circular or round configuration. The periphery region, such as the bending portion 122, may extend from the planar portion 120 and flare out to form a circular edge 702 or circular perimeter of the planar portion 120.

Figure 8:
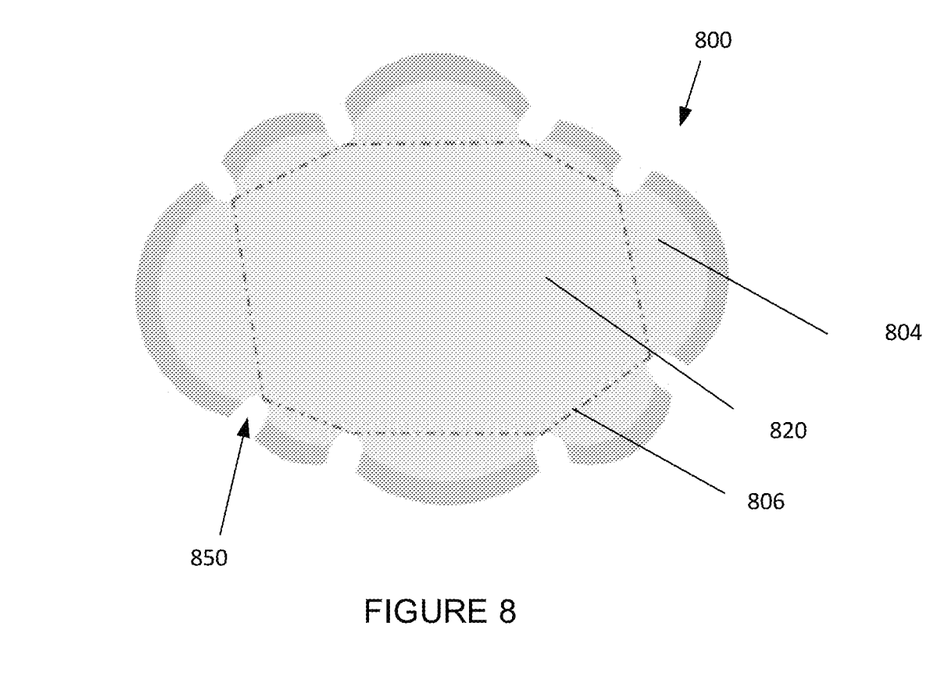
FIG. 8 depicts a top view of a flexible bending display in an irregular configuration with multiple bending portions in accordance with aspects of the disclosure.

FIG. 8 depicts a top view of an example display panel 800 with irregular configurations, such as polygonal configurations, or other suitable configurations. A plurality of relief features 850 may be formed at edges or periphery regions of the display panel 800. The display panel 800 may include a planar portion 820 and a plurality of bending portions 804 connecting with the planar portion 820. The bending portions 804 may be bendable or foldable along the bending line 806. Similarly, as described above, the active area may be formed or confined in the planar portion 820 of the display panel 800 only, or may be formed both in the planar portion 820 extending into the bending portion 804 based on different design requirements.

Figure 9:
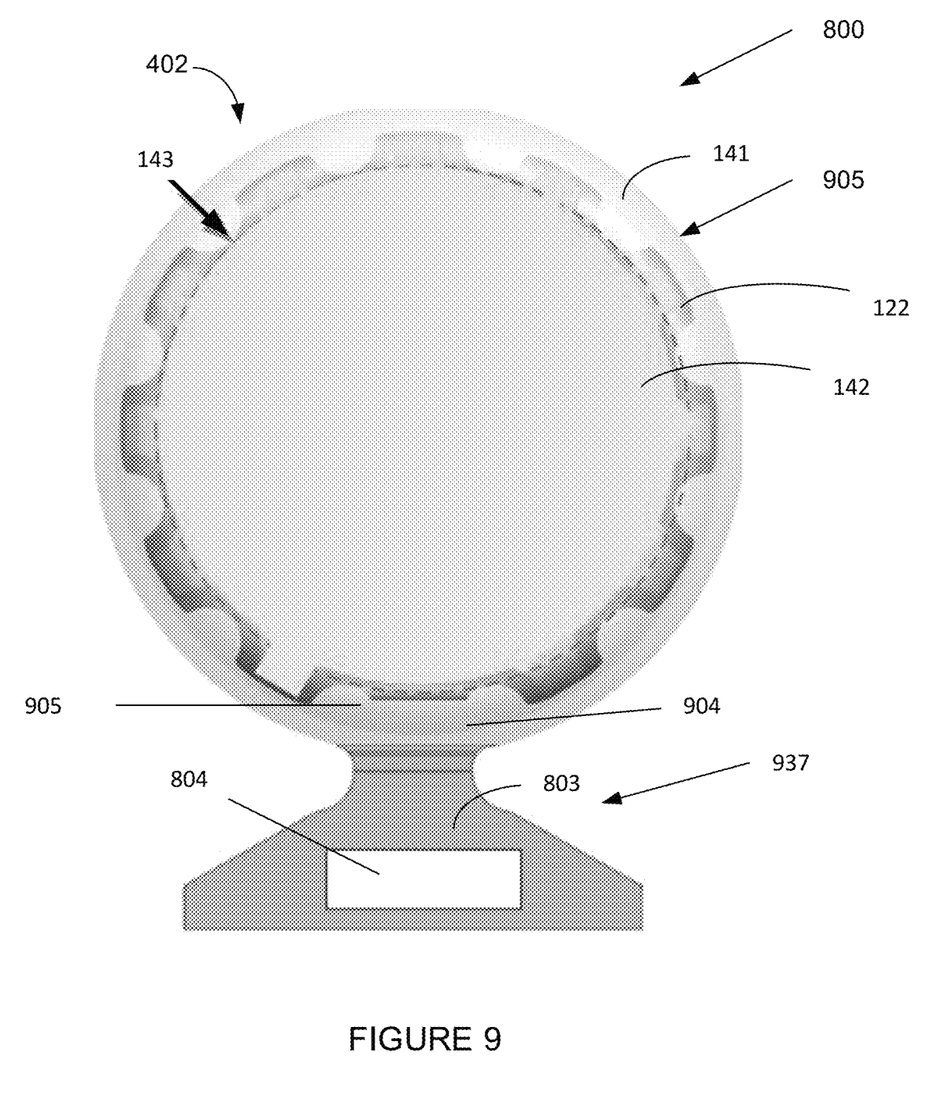
FIG. 9 depicts a top view of one example of a smartwatch having a display device integrated circuit (DDIC) integrated therein in accordance with aspects of the disclosure.

FIG. 9 depicts a top view of a portion of an example smartwatch 800. The smartwatch 800 includes the display assembly 402 disposed on a watch body (not viewable from the top). The plurality of relief features 143 is formed in the bending portion 122 of the display panel 142 with the cover layer 141 laminated on the display panel 142. A tail portion 937 may be formed and connected to the display panel 142. The tail portion 937 may be bendable. Thus, the tail portion 937 may be folded to a back side of the display panel 142. In the example depicted in FIG. 9, a display device integrated circuit (DDIC) 804 is disposed on the tail portion 937 of the display panel 142. The tail portion 937 may provide additional inactive area to facilitate forming the DDIC 804 or other additional periphery devices, drivers, or circuits thereon. Alternatively, the DDIC 804 or other additional periphery devices, drivers, or circuits may also be disposed on or in an accessory, such as a watch band, connected to a portion of the housing 905. In this example, the display device integrated circuit (DDIC) 804 may be disposed on the watch band connected in close proximity to the display assembly 402. The location of the display device integrated circuit (DDIC) 804 is selected to be in close proximity to the display panel 142 to minimize the electrical signal transmission or travelling electrical signal distance between the display panel 142 and the DDIC 804. It is noted that other periphery devices, drivers, or circuits may also be disposed at a location in close proximity to the display panel 142.

Figure 10:
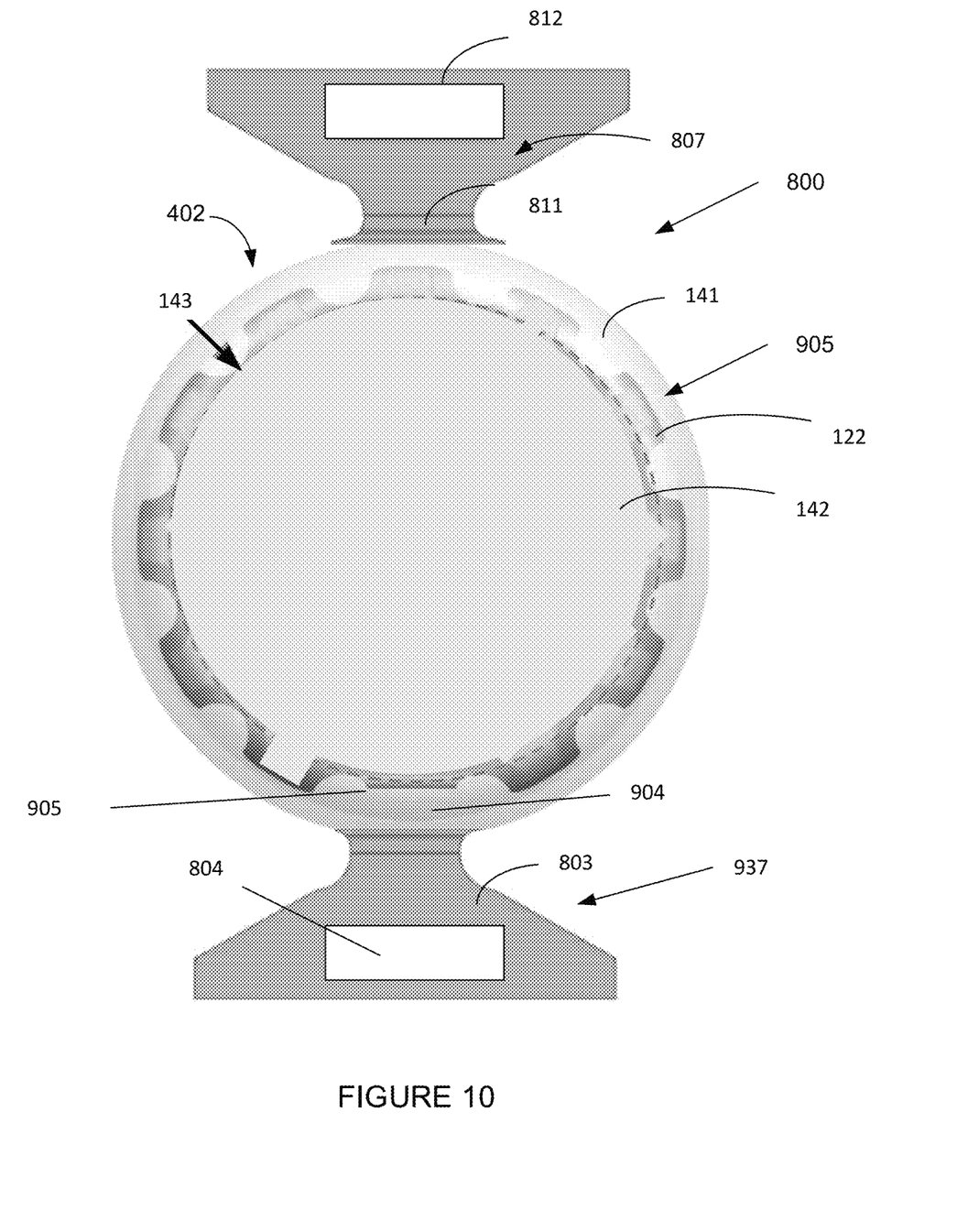
FIG. 10 depicts a top view of another example of a smartwatch having a display device integrated circuit (DDIC) integrated therein in accordance with aspects of the disclosure.

It is noted that an area 904 of the display panel 142 where the tail portion 937 is attached to may be configured to have a relatively larger dimension of the relief feature 905, e.g., a relatively larger dimension of the cut-out structures, to facility coupling of the tail portion 937 to the display panel 142. In the example depicted in FIG. 9, the tail portion 937 is formed on one side 803 of the display panel 142. In this example, eleven bendable flaps 122 are formed along with the tail portion 937 in the display panel 142. Alternatively, the tail portions 937, 807 may be formed at two opposite ends, such as the lower side 803 and an upper side 811, of the display assembly 402, as shown in FIG. 10. In this example, ten bendable flaps 122 are formed along with the two tail portions 937, 807 in the display assembly 402. Thus, the DDIC 804 or other periphery devices, drivers, or circuits 812 may be located or distributed among two sides of the display panel 142, such as the lower side 803 and the upper side 811, relative to the display assembly 402. This may provide uniform or equal distributions across different locations of the smartwatch 800.

The present disclosure provides an electronic device utilizing a flexible display panel with multiple relief features formed in a periphery bending portion of the flexible display panel. The multiple relief features may facilitate lamination of the flexible display panel to a curved cover layer. The flexible display panel may be in circular configurations having the multiple relief features formed in bending portions of an edge periphery of the flexible display panel. The multiple relief features may assist relieving local bending stress, thus eliminating likelihood of forming cracks or wrinkles during the lamination process. An active area for displaying images may extend to the bending portion of the flexible display panel, thus provided a wide viewing range and/or angle for a user as well as enhancing an overall aesthetic appearance of the electronic device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A display assembly, comprising:
a cover layer;
a flexible display panel positioned beneath the cover layer, the flexible display panel comprising:
a planar portion formed on a center region of the flexible display panel; and
a bending portion formed at a periphery region of the planar portion, wherein the periphery region surrounds the planar portion and comprises:
an active area, and
an inactive area, wherein the inactive area forms a continuous exterior region surrounding the flexible display panel; and
a plurality of relief features formed in the bending portion of the flexible display panel, wherein each of the plurality of relief features is partially rounded when the bending portion of the flexible display panel is on the same plane as the planar portion, each of the plurality of relief features extends from an outer edge of the bending portion towards the planar portion, and the plurality of relief features are evenly dispersed around the periphery region such that the bending portion is separated into uniformly shaped sections between adjacent pairs of the plurality of relief features.

2. The display assembly of claim 1, wherein the planar portion has a circular shape.

3. The display assembly of claim 1, wherein the planar portion has a polygon shape or irregular shape.

4. The display assembly of claim 1, wherein each of the plurality of relief features are cut-out portions of the bending portion of the flexible display panel.

5. The display assembly of claim 1, wherein the plurality of relief features comprises eleven or twelve relief features.

6. The display assembly of claim 1, wherein the active area comprises arrays of pixel circuits.

7. The display assembly of claim 1, wherein a plurality of electronic components are formed on the inactive area in the bending portion.

8. The display assembly of claim 1, further comprising:
a display device integrated circuit coupled to the flexible display panel.

9. The display assembly of claim 8, further comprising an accessory coupled to a housing, wherein the flexible display panel is positioned within the housing, and wherein the display device integrated circuit is disposed in the accessory in close proximity to the housing.

10. The display assembly of claim 1, further comprising:
an optically clear adhesive coupling the flexible display panel to the cover layer.

11. The display assembly of claim 1, wherein each of the plurality of relief features have an arc configuration, a triangular configuration, or a semi-circular configuration.

12. The display assembly of claim 1, wherein the display assembly is integrated in a wearable device.

13. The display assembly of claim 1, wherein the bending portion of the flexible display panel has a curvature that matches with a curvature of a curved side region of the cover layer.

14. An electronic device, comprising:
a cover layer; and
a flexible display panel having a planar center region and a curved periphery region surrounding the planar center region, wherein the planar center region has a circular shape, and the curved periphery region is bendable and comprises:
an active area, and
an inactive area, wherein the inactive area forms a continuous exterior region surrounding the flexible display panel; and
a plurality of relief features formed in the curved periphery region of the flexible display panel, wherein each of the plurality of relief features is partially rounded when the bending portion of the flexible display panel is on the same plane as the planar portion, each of the plurality of relief features extends from an outer edge of the bending portion towards the planar portion, and the plurality of relief features are evenly dispersed around the curved periphery region such that the curved periphery region is separated into uniformly shaped sections between adjacent pairs of the plurality of relief features.

15. The electronic device of claim 14, wherein a plurality of electronic components are formed on the inactive area in the curved periphery region.

16. The electronic device of claim 14, wherein each of the plurality of relief features have an arc configuration, a triangular configuration, or a semi-circular configuration.

17. The electronic device of claim 14, further comprising:
arrays of pixel circuits formed in the curved periphery region of the flexible display panel.

18. A method for forming a display assembly for an electronic device, comprising:
laminating a flexible display panel, having a planar center region, to a curved cover layer; and
positioning a plurality of rounded relief features formed in a curved periphery region of the flexible display panel under a curved side region of the curved cover layer, wherein each of the plurality of rounded relief features extends from an outer edge of the curved periphery region towards the planar center region of the flexible display panel, the plurality of rounded relief features are evenly dispersed around the curved periphery region such that the curved periphery region is separated into uniformly shaped sections between adjacent pairs of the plurality of rounded relief features, and the curved periphery region includes an inactive area forming a continuous exterior region surrounding the flexible display panel.

* * * * *